Patented July 15, 1930

1,770,686

UNITED STATES PATENT OFFICE

CLYDE C. DE WITT, OF HOUGHTON, MICHIGAN

SYNTHETIC MOLDING MATERIAL AND METHOD OF FORMING SAME

No Drawing.    Application filed April 8, 1929. Serial No. 353,694.

This invention relates to molding materials such as are employed in the casting of molten metals and relates particularly to a material of this type which is synthetically produced.

The material universally used in the casting of molten metals is what is known as molding sand. This sand, which is found in the natural state, has the characteristic that when moistened and formed to shape it will retain such shape while molten metal is poured therein, whereby after the metal has cooled the metal may be shaken out of the sand in its formed state. Natural molding sands are found in a relatively small number of localities throughout the country and generally occur in beds from three to fifteen feet deep. Invariably in such beds the sand near the top is too rich in binding qualities to be suitable for use, and that portion of the sand at the bottom of the bed is excessively lean in binder, while the central portion is usually of the desired quality. For this and other reasons, the uniformity of natural molding sands varies through a considerable range, which is oftentimes of great disadvantage in molding operations. Furthermore these sands, because of their relative scarcity, and because of the cost of transporting them to the point of use, are relatively expensive.

Accordingly it is the principal object of the present invention to provide a synthetic molding material which may be used alone for molding operations, or may be used in combination with other materials to produce a usable molding mixture.

It is another object to provide such a material that may be made at any point that a relatively clean sand of any type is available.

I have found that if substantially naked sand, such as shore sand, (which may be obtained in any desired quantities at a very small cost and in almost any locality), is so treated as to be artificially coated with a film of iron hydrogel, such sand upon being moistened may be employed as a molding material either by itself or in combination with other materials. This coating of iron hydrogel is substantially insoluble in water and consequently cannot be washed off with water. When this coated sand is moistened and allowed to remain in a moistened condition for a short time the iron hydrogel coating absorbs a certain amount of the water and swells and when formed into a mold the gelatinous coat of the adjacent particles coalesce with each other and bind the various grains together in a homogeneous mass able to hold its shape and withstand the pouring action of molten metals.

The method I employ in applying this coating of iron hydrogel to the sand particles is to subject the sand particles to a solution of iron hydrosol by any suitable method. This iron hydrosol becomes adsorbed on the sand grains as an iron hydrogel. I prefer to maintain the acidity of the iron hydrosol employed for this purpose within a range of from 4.5 pH to 6.2 pH. In contacting the sand grains with the iron hydrosol the action of the removal of the iron hydrosol from suspension is that of the neutralization of electrical charges on the particles of iron hydrosol by the surfaces of the sand grains, which do in fact possess an electrical charge opposite to that of the iron hydrosol, as well as the removal by the sand or material on the surface of the sand, thru selective adsorption or chemical action, of a part of the peptizing agent from the solution or the suspension medium.

I have also found that upon each treatment of the sand grains with the iron hydrosol there appears to be a certain limit as to the amount of iron hydrogel which is adsorbed on the surface of the sand grains, but that this coating may be increased to any thickness desired if the sand grains are subjected to more than one treatment of iron hydrosol and are allowed to dry, or partially dry, between each treatment. It may be important that the sand grains be provided with a thicker coating in some cases than in others and such coating may be obtained as above described.

The sand which is to be used in this material need not be absolutely naked chemically but may have coatings of iron oxide or other materials of a quality or type not suitable, or at least not fully suitable, for use as a molding material. The size of the sand grains may of course be regulated by a screen or other suitable grading operations in order to obtain the proper grain size for the permeability or other characteristic desired. Permeability may be further controlled by the addition of a suitable finely divided refractory material.

My preferred method of making the synthetic base sand is to use rounded or sharp, uniform sized grains of relatively infusible sand. An air separator or any other suitable device may be employed for cleaning and sizing the dry grains. These relatively dry sand particles are then treated with a relatively cold dilute solution of iron hydrosol having a pH value of from 4.5 to 6.2. It is desirable to maintain the pH value of the solution below 6.2 because of the rapid increase in viscosity of the solution and the very great instability of the solution above this value. If necessary the sand may be mixed in a moist condition in order that the distribution of the iron hydrosol be as uniform as possible. At the option of the user the sand so treated may be allowed to air dry or to be otherwise dried. I have obtained the best results through the use of a drying temperature which does not exceed the boiling point of water.

The iron hydrosol can be prepared most easily in the following manner: Allow a dilute solution of ferric chloride to dissolve all the hydrated iron oxide or ferric hydroxide that it can when the temperature of the solution is approximately 90° C. to 100° C. When properly prepared such a solution will contain approximately one part of ferric chloride to 15 parts of iron oxide. The resultant colloidal solution will be a clear, amber-colored liquid. The pH value of the iron hydrosol may be adjusted by means of suitable neutralizing agents or buffers, the function of which is common knowledge and can be obtained from any text book on physical or electro-chemical. There are various other methods that may also be employed for preparing iron hydrosol.

It will be apparent that it is quite possible that other refractory material having a grain size similar to that of sand may be coated with iron hydrogel as above described and thus be employed for substantially the same purpose, and it is to be understood that in the following claims where the word "sand" is employed it is to be interpreted not as limited solely to sand itself but to any other refractory material of like grain size which may be employed in its stead in molding operations.

It will also be apparent that the process of coating sand or other appropriate particles with iron hydrogel may also be useful in arts and manufactures other than those connected with molding sand base. For instance, by this process it is possible to control the amount and form of the iron hydrogel and, therefore, to regulate the color of many useful articles of commerce. Further although I have herein specified the coating as being a gelatinous iron compound, it is quite possible that compounds other than iron may be employed with equally satisfactory results, and I, therefore, do not limit myself specifically to the use of iron hydrogel.

Formal changes may be made in the specific embodiment of the invention described without departing from the spirit and substance of the broad invention, the scope of which is commensurate with the appended claims.

What I claim is:—

1. A granular refractory material provided with an artificial gel coating substantially insoluble in water after drying at normal temperatures.

2. A granular refractory material having an artificial coating of a metallic hydrogel containing a single metallic element.

3. A granular refractory material having an artificial coating of iron hydrogel.

4. An article of manufacture comprising sand having an artificial coating of iron hydrogel.

5. The method of treating a sand not suitable for molding purposes to adapt it for such purposes, comprising in subjecting said sand to a solution of iron hydrosol.

6. The method of treating a sand not suitable for molding purposes to adapt it for such purposes, comprising in subjecting said sand to a solution of iron hydrosol having a pH value of from 4.5 to 6.2.

7. The method of coating sand grains or the like with iron hydrogel, comprising in treating said grains with a solution of iron hydrosol, at least partially drying said grains, and then again treating said grains to a solution of iron hydrosol.

CLYDE C. DE WITT.